US005699376A

United States Patent [19]

Richmond

[11] Patent Number: 5,699,376
[45] Date of Patent: Dec. 16, 1997

[54] LASER SYSTEM AND METHOD USING PLURAL GAIN ELEMENTS AND THERMAL LENSING

[75] Inventor: Andrew Mark Richmond, Rugby, United Kingdom

[73] Assignee: Lumonics Ltd., Warwickshire, United Kingdom

[21] Appl. No.: 659,892

[22] Filed: Jun. 7, 1996

[30] Foreign Application Priority Data

Jun. 9, 1995 [GB] United Kingdom .......... 95-11688

[51] Int. Cl.$^6$ ...................................... H01S 3/14
[52] U.S. Cl. .................. 372/68; 372/9; 372/39; 372/69; 372/70; 372/72; 372/98; 372/101
[58] Field of Search ...................... 372/9, 19, 34, 372/39, 40, 69, 70, 72, 98, 92, 101, 109, 75, 68, 100

[56] References Cited

U.S. PATENT DOCUMENTS

| 4,713,820 | 12/1987 | Morris et al. ........................ 372/41 |
| 4,803,694 | 2/1989 | Lee et al. ........................... 372/98 |
| 4,858,239 | 8/1989 | Shoshan ............................. 372/9 |
| 4,860,301 | 8/1989 | Nicholson ......................... 372/68 |
| 5,001,718 | 3/1991 | Burrows et al. ................... 372/33 |
| 5,046,070 | 9/1991 | Negus ............................... 372/33 |
| 5,170,406 | 12/1992 | Tidwell ............................. 372/71 |
| 5,410,559 | 4/1995 | Nighan, Jr. et al. .............. 372/19 |
| 5,528,612 | 6/1996 | Scheps et al. .................... 372/23 |
| 5,548,608 | 8/1996 | Zhang .............................. 372/75 |

Primary Examiner—Brian Healy
Attorney, Agent, or Firm—Nixon & Vanderhye P.C.

[57] ABSTRACT

A laser system is described in which two laser elements are configured as an oscillator and an amplifier in a common optical pumping section. Oscillator element is in a resonator and a divergent oscillator output beam is steered by a steering arrangement back to the amplifier element. The divergence of the beam from the resonator is adjusted, by moving output coupler element or selecting particular curvatures of resonator mirrors for example, to match the thermal lensing power of the amplifier element so that a substantially collimated output beam is produced.

10 Claims, 2 Drawing Sheets

LASER SYSTEM AND METHOD USING PLURAL GAIN ELEMENTS AND THERMAL LENSING

FIELD OF THE INVENTION

This invention relates to a laser system. In particular, it relates to a solid state laser system in which at least two active laser elements are provided in a single pumping section, for example in an oscillator-amplifier configuration.

BACKGROUND OF THE INVENTION

As is well known, solid state laser systems generally comprise a resonator bounded by one totally reflecting mirror and one partially transmitting mirror and a solid state active laser element between the two mirrors. The laser element may typically be of Nd:YAG but may be of other substances. The laser element is excited in a pumping section, typically by optical pumping lamps and the laser light is output through the partially transmissive mirror. The laser element therefore acts as an oscillator. It is also well known to improve the performance of such systems by using a further solid state active laser element in the output path as an amplifier.

In order to visualise the axial and transverse distribution of circulating laser power within a laser resonator, it is usual to depict this by overlaying the limits of the highest order mode of the resonator on a scale drawing of the resonator. These limits then define the 'mode envelope' and 'mode shape' of the distribution. An ideal low power oscillator would have the distribution shown schematically in FIG. 1. In this figure, reference numerals 1 and 3 refer respectively to a plane partially-transmitting output coupler and a plane totally-reflecting rear mirror. A solid state active gain laser element 2 is positioned between the two mirrors. The mode envelope is designated by 2'. The laser intensity within the resonator is generally highest along the central axis thereof and decreases with increasing radius. In one typical depiction, the mode envelope represents the locus of points where the circulating intensity is $1/e^2$ times the corresponding peak (ie axial) circulating intensity, or within which a certain percentage (usually 86% or 90%) of the circulating power is contained. The mode diameter at any point within the resonator, defined as the width of the mode envelope at that point, will generally be governed by the components, the spacing of the optical components within, and bounding, the resonator and the optical powers of these components. FIG. 1 shows the situation where the laser element 2 has no optical power and the mirrors are both plane mirrors and therefore the diameter of beam B is essentially constant.

In practice, and for a high average power solid state laser, the mode diameter varies within the resonator. It is well known that when a solid state laser element, and in particular a cylindrical element, is excited above fairly modest input power levels, the element develops optical power which is usually positive optical power. This occurs because of relatively poor thermal conductivity of the element, leading to the build up of a temperature gradient between the axis and wall of the element. This effect is known is as "thermal lensing". The lensing effect is distributed over the element in its axial direction. Thus, for simplicity it can be envisaged as arising from a convex lens situated at an effective plane, mid-way along the element. This effect is illustrated in EP-A-0 400 830. In reality, when a laser element exhibits thermal lensing, it behaves as an optical duct with a quadratic transverse variation of refractive index. The relationship between input and output beams for the element may be calculated using ABCD optical matrices or ray-tracing techniques.

FIG. 2 shows schematically an oscillator operated at higher power in which the solid state laser element 2 develops thermal lensing. The beam is widest at element 2 and narrows towards the two mirrors 1 and 3. Since mirror 1 is a plane mirror, the mode envelope exhibits a beam waist at mirror 1, resulting in a divergent output beam from the output coupler mirror 1. The output beam divergence is inversely proportional to the mode diameter of the waist at the output coupler. Since the diameter of the beam waist at mirror 1 varies with the separation of the mirror from laser element 2 it will be appreciated that if the output coupler is situated farther away from the solid state laser element then the beam waist diameter at the output coupler will be quite small and therefore the divergence will be large. This is generally unsatisfactory for practical applications and requires correction. Correction is necessary because laser users typically require a collimated output beam since its characteristics, particularly beam diameter, do not vary significantly with propagation distance. This correction can be achieved by using lenses but since the effect varies with pumping power it is difficult to correct properly over a range of pumping powers.

It is well known to utilise one or more separate amplifier sections, each having a solid state active gain laser element, after the oscillator section. Each amplifier in such a chain receives an input beam from a preceding amplifier or from the oscillator and has its own respective optical pumping section containing the amplifying laser element, excitation lamp or lamps and other components.

U.S. Pat. No. 4,860,301 discloses a laser system in which an oscillator element and one or more amplifying elements are all mounted in a common optical pumping section, sharing excitation (pumping) lamps and power supplies and are configured such that the oscillator element is in a resonator and the light emerging from the resonator is reflected back towards the or each respective amplifying element. The present invention relates to systems of this type, as shown schematically in FIG. 3. As shown in the figure, the system involves a single pumping section 4 incorporating two laser elements 2 and 5 configured, respectively, as oscillator and amplifier elements. Oscillator element 2 is mounted between mirrors 1 and 3 to form an oscillator as in FIGS. 1 and 2 and the output beam from the oscillator is directed back towards the amplifier element 5 by a beam turning system 6.

The use of two laser elements within the single pumping section is known. The advantage of these is the following:

Pumping sections for solid state lasers are generally fairly inefficient at transferring excitation energy, from excitational pumping lamps for example, to the solid state laser element. The proportion of the excitation light which is captured by the solid state element is primarily related to the ratio of the total cross sectional area of the laser element to that enclosed within the pumping section. The excitation efficiency is also reduced due to fixed loss mechanisms for the excitation radiation at the ends of the pumping section. This is because the materials forming the ends of the enclosure generally have lower reflectivity and also are provided with spaces or annuli for the delivery of cooling fluid to the laser element and excitation lamps. The effect of placing more than one laser element inside a pumping section is to increase the proportion of light emitted by the excitation lamp or lamps that is intersected by the combined laser elements and therefore to improve laser output power. It has indeed been found that placing two solid state laser elements within a single pumping section can increase system efficiency by up to 80%.

In a system configured as shown in FIG. 3, in which the oscillator resonator has a mode shape generally as shown in FIG. 2, there are two main problems. The first of these is the high divergence of the oscillator output beam. The second problem is the thermal lensing power in the amplifier element 5. Usually, a slightly divergent or collimated beam is presented to an amplifier element which provides a convergent amplifier output beam requiring correction, by lenses, etc. Traditionally, each of these effects would have been corrected separately, either inadequately or by complex and therefore expensive means. One method for correction is described in EP-A-0 400 830.

It is an object of the present invention to provide an improved laser system having easier or automatic output beam collimation.

SUMMARY OF THE INVENTION

According to the present invention there is provided a laser system comprising: first and second solid state active gain elements, the second element having an input face and output face; common optical pumping means for exciting said elements, the excitation being such as to induce thermal lensing power at least in the second element; a laser resonator comprising at least an output coupler, wherein the first element is located within the resonator and provides an output beam from the output coupler; optical coupling means for coupling and steering the output beam from the output coupler into the input face of the second element, wherein the output beam from the output coupler is a divergent beam having a wavefront with a radius of curvature that increases with propagation distance in the region of the second element; the system being configured such that the wavefront radius of curvature at the input face of the second element is matched to the thermal lensing power of the second element so that a substantially collimated beam emerges from the output face of the second element.

According to the present invention there is further provided a method for obtaining a substantially collimated output beam from a laser system comprising first and second solid state active gain elements, the second element having an input face and output face; common optical pumping means for exciting said elements, the excitation being such as to induce thermal lensing power at least in the second element; a laser resonator comprising at least an output coupler, the first element being located within the resonator and providing an output beam from the output coupler; and optical coupling means for coupling and steering the output beam from the output coupler into the input face of the second element, the method comprising obtaining an output beam from the output coupler which is divergent, having a wavefront with a radius of curvature that increases with propagation distance in the region of the second element, wherein the radius of curvature of the beam waveform at the input face of the second element is selected or adjusted so that it matches the thermal lensing power of the second element so as to obtain a substantially collimated output beam from the second element.

In practice, the radius of curvature will not generally be actually measured, although it can be calculated, instead the configuration of the components may be adjusted until collimation is achieved.

BRIEF DESCRIPTION OF THE DRAWINGS

Embodiments of the invention will now be described, by way of example only, with reference to the accompanying drawings.

DESCRIPTION OF PREFERRED EMBODIMENTS

Figure 1:
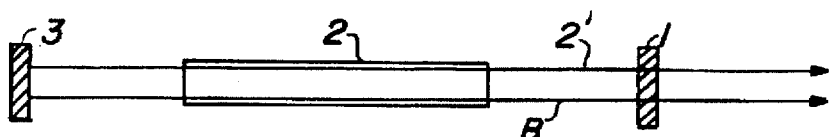
FIG. 1 shows a solid state laser resonator of the prior art having a low repetition rate.
Figure 2:
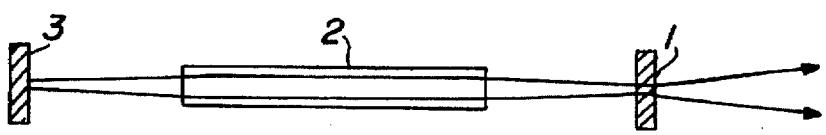
FIG. 2 shows a solid state laser resonator of the prior art of high average power.
Figure 3:
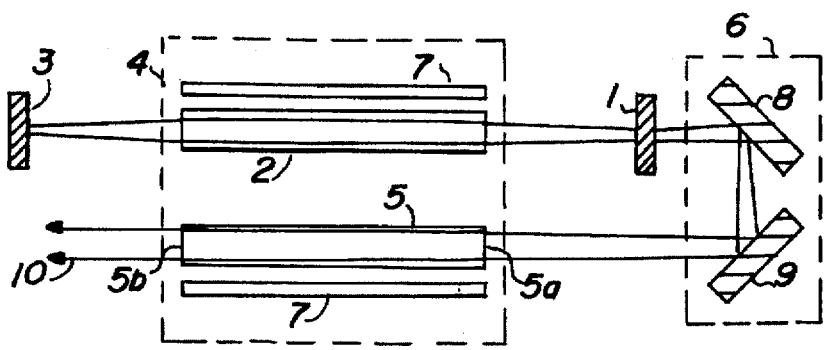
FIG. 3 shows a solid state laser apparatus having two laser elements configured in an oscillator-amplifier configuration in a single pumping chamber.
Figure 6:
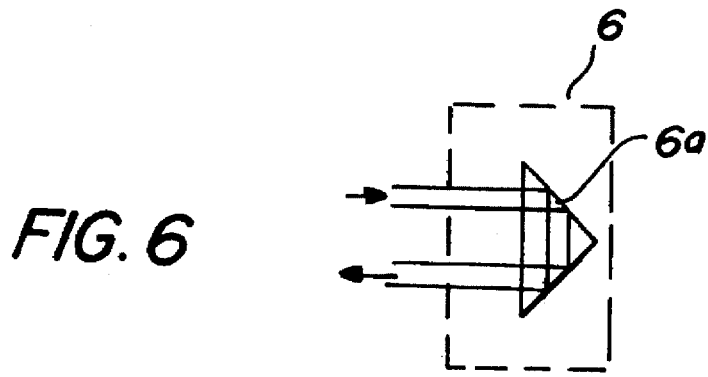
FIG. 6 shows an alternative beam turning system.

As shown in FIG. 3, a laser system embodying the present invention comprises a common pumping section 4 having one or more excitation lamps 7 for providing excitation radiation to two solid state active laser elements 2 and 5. Element 2 is configured as an oscillator in a resonator bounded by a reflecting mirror 3 and a partially transmissive output coupler 1. Although these are shown as plane in the figure, one or more of them may be curved. Excitation radiation from the lamp 7 excites laser element 2 in the normal manner and an output beam is produced at output coupler 1. This is applied to a beam turning system 6 which is shown in the figure as comprising two plane mirrors 8 and 9. In practice, however, other bending systems may be used such as a plurality of prisms, a single multi-faced prism, curved elements, etc. FIG. 6 shows schematically a prism 6a forming an alternative beam turning mechanism.

Beam turning apparatus 6 turns the output beam through 180° to the second solid state laser active gain element 5. Element 5 is also acted upon by excitation from lamp or lamps 7 and serves as an amplifier element to produce a laser output beam 10. This beam provides the output beam for materials processing or any other laser application.

In one embodiment, the laser elements are Nd:YAG elements but they may be any other types of solid state laser elements. The laser may be operated in any mode of operation ranging from continuous operation to pulsed operation at any desired duty cycle.

As described above, the oscillator element 2 develops thermal lensing and therefore the beam from coupler 1 is divergent, having a wavefront radius of curvature which increases as the distance from coupler 1 increases, at least in the region of second element 5. Clearly, the amount of divergence will increase as the distance of coupler 1 from the end of element 2 increases. Beam turner 6 is configured such that it does not itself have any optical power and merely turns the beam without altering its divergence. Thus, the divergence of the beam entering the input face 5a of the amplifier element 5 may be controlled by, inter alia, altering the spacing between coupler 1 and element 2. As is also described above, element 5 also develops thermal lensing and therefore, by adjusting the apparatus so that the divergence of the beam impinging upon input face 5a is sufficient to compensate for the thermal lensing effect of element 5, then the beam emerging from the output face 5b of element 5 will generally be collimated.

In practice, it is impossible to achieve perfect collimation and normally a beam which is considered collimated will have a large waist a certain distance away from the output end of an element. Such a collimated beam can then be focussed to a small diameter, by additional focussing optics, for the purpose of materials processing or other applications.

Figure 4:
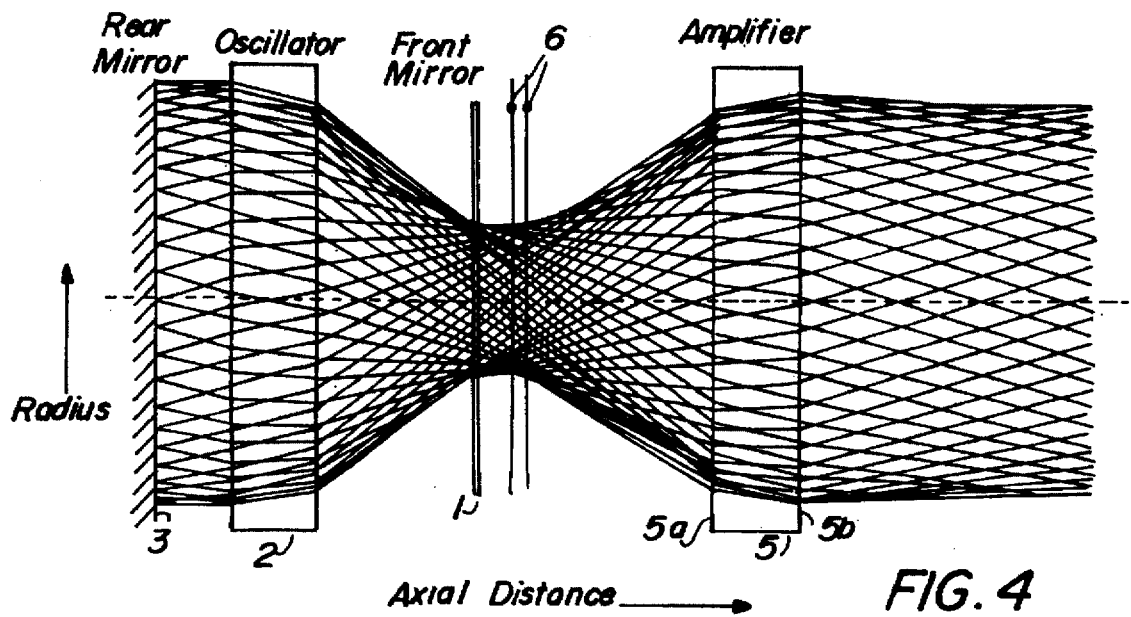
FIG. 4 shows a mode envelope for apparatus as shown in FIG. 3.
Figure 5:
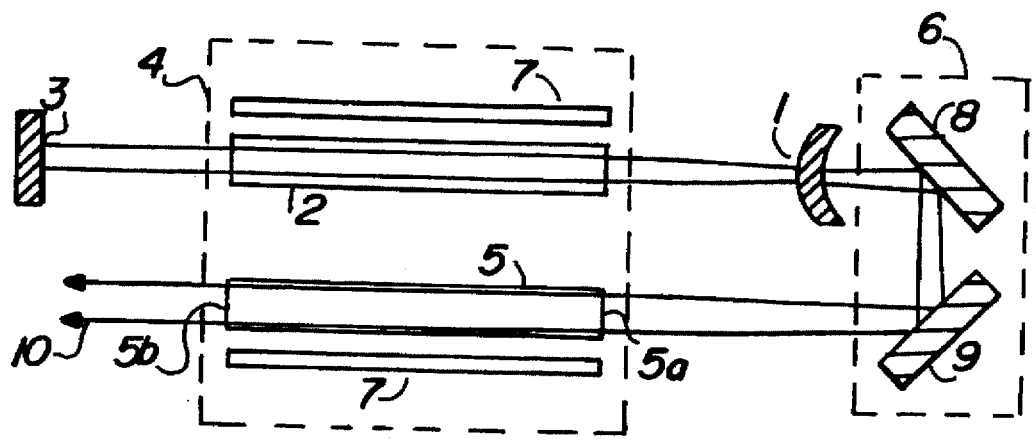
FIG. 5 shows a solid state laser apparatus similar to that of FIG. 3 but having a convex output coupling mirror.

FIG. 4 illustrates the mode shape for one embodiment of the invention. It should be noted that in this diagram a linear beam path has been shown as if the beam continues in a straight line since the beam turning means 6 has no effect on the mode shape itself. In the example shown in FIG. 4, the output coupler is placed farther from the oscillator element 2 than the rear mirror 3. As an alternative, the mirrors may be of different curvature. An example is shown in FIG. 4 in which the output coupler is convex while the rear mirror is plane. This is shown in FIG. 5 in which the output coupler 1 is an equi-thickness convex mirror, with the convex faces directed toward the oscillator rod 2.

The embodiment of FIG. 4 results in a beam waist between the output coupler 1 and the beam turner 6. In one embodiment, the output coupler is convex, with radius of curvature 330 mm, and the resonator length is about 400–600 mm. The effect of a system as shown in FIG. 4 is that the mode diameter at output coupler 1 is significantly smaller than at mirror 3 and therefore the output beam divergence is large.

As shown in the figure, the mode diameter generally reduces towards coupler 1 and is divergent in the region between a beam waist, located after the coupler, and the amplifier 5.

The thermal lensing effect of amplifier 5 tends to converge the input beam and therefore, if the converging thermal lensing effect of element 5 is approximately matched to the radius of curvature of the beam wavefront at the input face 5a of element 5 then the output beam from output face 5b of element 5 will be approximately collimated.

If the thermal powers of elements 2 and 5 are fixed, then compensation can be achieved by altering the relative spacing of, inter alia, element 2, output coupler 1 and element 5. The position of output coupler 1 may be varied, to alter the wavefront curvature at input face 5d. Alternatively, output coupler 1 may have optical power (eg be a curved mirror) and the degree of curvature chosen appropriately. Beam turner 6 may also or alternatively have optical power and be shifted to increase or decrease the wavefront curvature at input face 5a. Other types of adjustment suitable to substantially compensate the effect of the beam divergence at the input face 5a of element 5 with the thermal lensing power of element 5 will be apparent. Amongst the variables affecting collimation are the curvature (if any) of the coupling mirrors, the thermal lensing power of the laser elements, and the spacing between the output coupler and the amplifier element. Any of these, or other variables, may be adjusted, whether singly or in combination.

Since the oscillator and amplifier elements are situated in a common pumping section, sharing excitation lamps and power supplies then, if collimation is achieved at a particular excitation level, this correction substantially applies over a wide range of excitation levels. This is because the divergence of the oscillator output beam and the collimation-correcting optical properties of the amplifier element both relate to the respective thermal lensing powers of the two elements, which increase in step since both elements are mounted in the same pumping section and are subject to the same changes in excitation.

In alternative embodiments, more than one amplifier element may be used, each additional amplifier being incorporated in the same single pumping section as the other laser elements. The output beam from one amplifier element is turned back as an input to another amplifier element, in which case the combined optical powers of the amplifier elements are used to correct the collimation of a final output beam.

In the embodiment shown in FIG. 4, the beam turner 6 is located approximately at or close to the beam waist of the oscillator output beam. This is desired, but not essential, since it leads to optimum extraction of stored energy from both laser elements, as follows. If the beam waist is located approximately mid-way between oscillator element 2 and amplifier laser elements 5 then, because the mode shape is symmetrical about the position of the beam waist, the respective mode diameters at elements 2 and 5 will be similar. Since in the embodiment shown elements 2 and 5 have the same diameter, this means that the ratio of mode diameter to element diameter is similar for each element. This ratio can therefore be optimised for maximum output power.

I claim:

1. A laser system comprising:

first and second solid state active gain elements, the second active gain element having an input face and output face;

at least one common optical pump operable to excite said first and second active gain elements, the excitation being such as to induce thermal lensing power at least in the second active gain element;

a laser resonator comprising at least an output coupler, wherein the first active gain element is located within the resonator and provides an output beam from the output coupler; and at least one optical coupler operable to couple and steer the output beam from the output coupler into the input face of the second active gain element, wherein the output beam from the output coupler is a divergent beam having a wavefront with a radius of curvature that increases with propagation distance in the region of the second active gain element;

the system being configured such that the wavefront radius of curvature at the input face of the second active gain element is matched to the thermal lensing power of the second active gain element so that a substantially collimated beam emerges from the output face of the second active gain element.

2. A laser system as claimed in claim 1, wherein the second active gain element is an amplifier.

3. A laser system as claimed in claim 1, wherein the relative position of the output coupler is variable to alter the wavefront radius of curvature at the input face of the second active gain element.

4. A laser system as claimed in claim 1, wherein the resonator includes at least one curved optical component.

5. A laser system as claimed in claim 1, wherein the resonator comprises two mirrors and the mode diameter is smaller at one mirror than the other; wherein the mirror at which the mode diameter is smallest is used as the output coupler.

6. A laser system as claimed in claim 1, wherein the at least one optical coupler is positioned so that the ratio of mode diameter to element diameter is the same at the input face of the second active gain element and the adjacent face of the first active gain element.

7. A laser system as claimed in claim 6, wherein the at least one optical coupler is a prism.

8. A method for obtaining a substantially collimated output beam from a laser system comprising first and second solid state active gain elements, the second element having an input face and output face; at least one common optical pump operable to excite said first and second active gain elements, the excitation being such as to induce thermal lensing power at least in the second active gain element; a laser resonator comprising at least an output coupler, the first active gain element being located within the resonator and providing an output beam from the output coupler; and at least one optical coupler operable to couple and steer the output beam from the output coupler into the input face of the second active gain element, the method comprising obtaining an output beam from the output coupler which is divergent, having a wavefront with a radius of curvature that increases with propagation distance in the region of the second element, wherein the radius of curvature of the beam at the input face of the second element is selected or adjusted so that it matches the thermal lensing power of the second element so as to obtain a substantially collimated output beam from the second active gain element.

9. A method as claimed in claim 8, wherein collimation is obtained by selecting one or more from the following group of parameters; the optical path length between the output coupler and the input face of the second active gain element, the curvature of one or more optical elements in the system, and the thermal lensing power of one or more laser elements.

10. A method as claimed in claim 8, wherein the selection or adjustment is conducted at a chosen excitation level.

* * * * *